US006763851B1

United States Patent
Breitweg et al.

(10) Patent No.: US 6,763,851 B1
(45) Date of Patent: Jul. 20, 2004

(54) ROTARY SHIFT VALVE FOR SERVO-ASSISTED STEERING SYSTEMS OF MOTOR VEHICLES

(75) Inventors: Werner Breitweg, Bargau (DE); Rainer Schänzel, Essingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 09/979,568
(22) PCT Filed: May 6, 2000
(86) PCT No.: PCT/EP00/04072
§ 371 (c)(1), (2), (4) Date: Jan. 17, 2002
(87) PCT Pub. No.: WO00/68061
PCT Pub. Date: Nov. 16, 2000

(30) Foreign Application Priority Data

May 11, 1999 (DE) .......................... 199 21 745

(51) Int. Cl.$^7$ ................................. F15B 9/10
(52) U.S. Cl. ................... 137/625.21; 91/375 A
(58) Field of Search ........... 137/625.21, 625.22, 137/625.23; 91/375 A, 375 R

(56) References Cited

U.S. PATENT DOCUMENTS 5,538,096 A * 7/1996 Breitweg .................. 91/375 A
5,542,338 A * 8/1996 Rupp ....................... 91/375 R
5,769,121 A * 6/1998 Breitweg ............... 137/625.23
6,276,487 B1 * 8/2001 Bieber et al. ............. 91/375 A

FOREIGN PATENT DOCUMENTS

| DE | 41 08 597 | 9/1991 |
| DE | 43 10 396 | 10/1993 |
| EP | 0 736 442 | 10/1996 |

* cited by examiner

Primary Examiner—John Rivell
(74) Attorney, Agent, or Firm—Kenyon & Kenyon

(57) ABSTRACT

A rotary slide valve for power-assisted steering systems of motor vehicles includes a rotary slide which is connected fixedly in terms of rotation to a valve input member. The control bush is connected fixedly in terms of rotation to a valve output member. The two valve elements are arranged so as to be movable coaxially one in the other and are rotatable relative to one another at most by the amount of the rotary travel of a backlash coupling. The rotary slide has outer and the control bush inner longitudinal control grooves which cooperate with one another in order to control a pressure medium to and from two working spaces of a servomotor. The rotary slide is connected to the valve output member via a torsion-bar spring. Production-related tolerances which may lead to undesirable effects in driving behavior are compensated by a connecting element.

12 Claims, 2 Drawing Sheets

ROTARY SHIFT VALVE FOR SERVO-ASSISTED STEERING SYSTEMS OF MOTOR VEHICLES

FIELD OF THE INVENTION

The present invention relates to a rotary slide valve for power-assisted steering systems of motor vehicles.

BACKGROUND INFORMATION

Rotary slide valves for power-assisted steering systems normally contain two valve elements which are arranged so as to be movable coaxially one in the other and are arranged so as to be rotatable relative to one another to a limited extent in order to achieve a control travel. In this case, the first valve element, which is connected to a valve input member, is designed as a radially outer rotary slide. A second valve element is connected fixedly in terms of rotation to a valve output member designed as a driving pinion and is designed as a radially inner control bush. The rotary slide is additionally connected to the driving pinion via a backlash coupling limiting a control travel. Both valve elements have longitudinal control grooves which are limited at least partially in their axial extent and serve for controlling a pressure medium from or to working spaces of a servomotor.

A torsion-bar spring serves for resetting the two valve elements from a deflected position into their neutral position.

In conventional rotary slide valves, the control bush is suspended in a suspension pin pressed into the driving pinion. For this assembly step, it is necessary to have play in the suspension connection between the suspension pin and the control bush. However, because of the play which is present, a relative movement may occur between the rotary slide and the control bush, without a steering torque having been introduced by a steering handwheel. This results in undesirable oil streams to the working spaces of the servomotor. These undesirable oil streams are manifested, in addition, by steering torque jumps on the steering handwheel, which result in selfsteering effects and may therefore lead to the driver having a feeling of uncertainty.

In the rotary slide valves described above, the rotary slide is connected fixedly to the valve input member and the control bush to the valve output member. There are, however, also conventional rotary slide valves which operate with valve elements assigned in reverse. The invention present may be used, along with the same benefits, for these rotary slide valves.

The valve output member may be designed as a driving pinion or as a ball screw, depending on use in rack-and-pinion or ball-and-nut power-assisted steering systems.

Such a rotary slide valve is described in German Published patent Application No. 41 08 597.

The rotary slide valve is designed so that the engagement dimensions of the take-up connection are sufficiently large to ensure a firm fit, without this resulting in a large-size valve assembly. The take-up pin, which projects at right angles from an outer circumference of the pinion shaft, is inserted into a pin hole which extends in the radial direction of the valve bush. The pinion shaft is thereby operatively connected to the valve bush. The mid-axis of the inside diameter of the valve bush intersects the mid-axis of the pin hole and is displaced from the mid-axis of the valve assembly in the direction of that side of the valve assembly which is located opposite the pinhole.

It is an object of the present invention to provide a rotary slide valve, in which the play between the valve input member and the valve output member is eliminated and angular and longitudinal movability is maintained between a valve element configured as a control bush and a valve output member configured as a driving pinion, in order to allow the compensation of lateral error.

SUMMARY

The foregoing object of the present invention is achieved by providing a rotary slide valve as described herein.

The connection of the control bush to the driving pinion is made by a tolerance-insensitive and play-free press connection in the form of a connecting element. The connecting element may be connected in one piece to the control bush or may be coupled to the control bush by forming or joining.

The control bush or the connecting element may be configured in the connection region as a solid shaft, a hollow shaft or a polygon.

The connecting element may have a profile, for example, in the form of a boss located on the circumference, which profile may be applied both to the control bush and in the driving pinion. It is necessary merely to ensure a tolerance-insensitive, centric and play-free connection of the two parts. By virtue of a flexible configuration of a region between a connection region of the control bush and the driving pinion and a control region of the control bush, transverse forces acting from out side may be distributed uniformly and the two parts may therefore be fixed, free of play, relative to one another. Lateral and angular error s which are present may thereby be compensated so that there are no distortions within the rotary slide valve.

The flexibility of the region between a connection region of the control bush and the driving pinion and a control region of the control bush is obtained by the introduction of at least one cut and is influenced by the width, depth and length of the latter and by the arrangement and density of the cuts.

The cuts are introduced by high-energy beam cutting, plasma cutting, erosion cutting, punching, grinding or milling.

Forces acting from outside, such as distortions in the steering column, elastic influences or different thermal expansions of the individual components in relation to one another, which adversely influence the functioning of previous rotary slide valves, are avoided. Production tolerances may also be compensated in terms of their influences on the functioning of the rotary slide valves.

Assembly is performed merely by joining together axially. This arrangement provides advantages with regard to the outlay in terms of production and assembly.

Assembly may also be performed fully automatically with the aid of force/path monitoring, thus leading to a higher reproducibility of quality and functioning. An example embodiment of the present invention is described below with reference to the several Figures.

DETAILED DESCRIPTION

Figure 1:
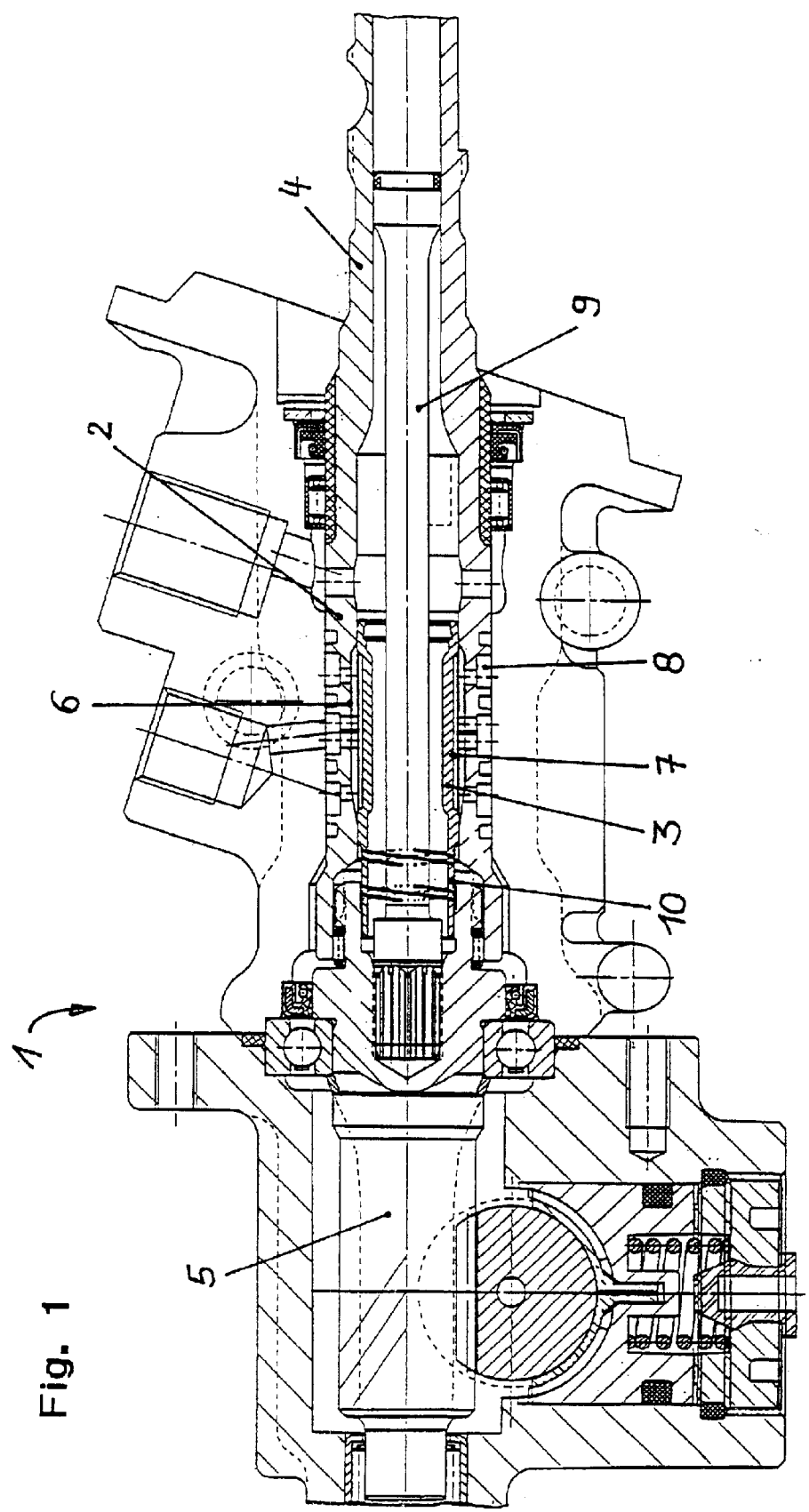
FIG. 1 is a longitudinal cross-sectional view through a rotary slide valve according to the present invention by the example of a rack-and-pinion power-assisted steering system of a motor vehicle.
Figure 2:
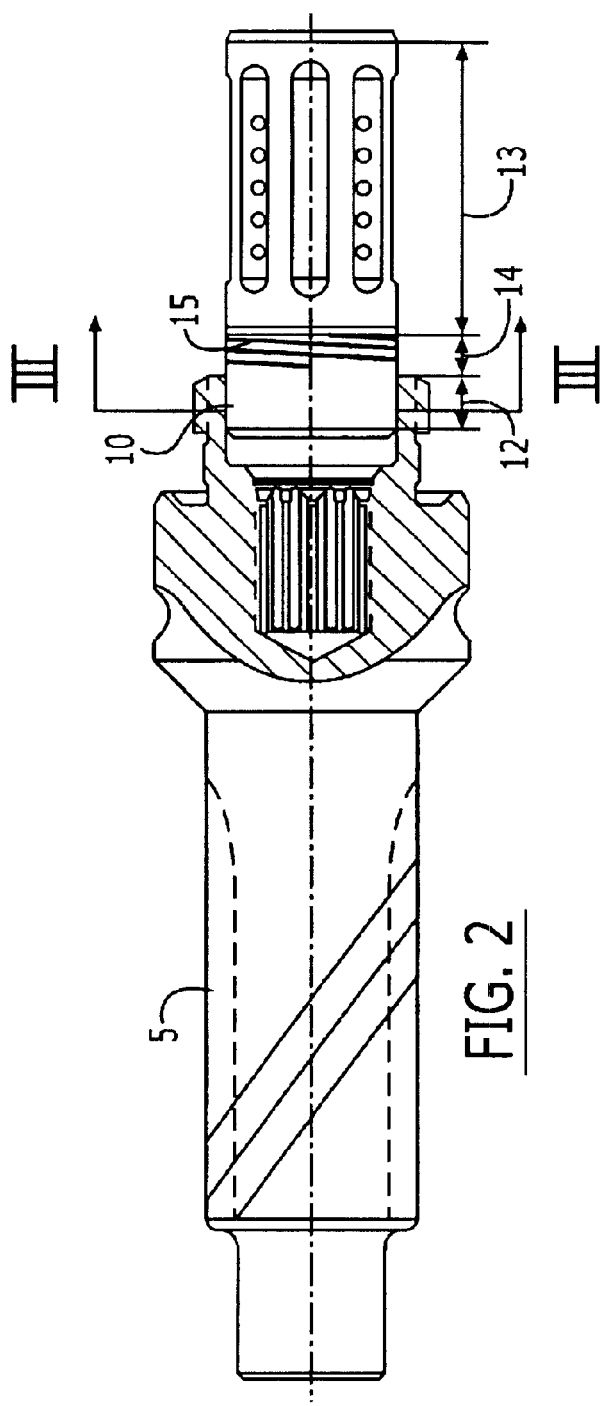
FIG. 2 is an enlarged view of a rotary slide valve according to the present invention.
Figure 3:
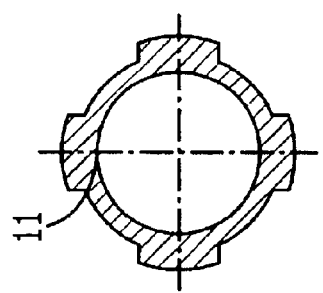
FIG. 3 is a cross-sectional view taken along the line III—III of the rotary slide valve illustrated in FIG. 2.

The present invention is described with reference to the example of a rotary slide valve for a rack-and-pinion power-assisted steering systems. The invention may, however, also be applied, to the same effect, to other power-assisted steering systems, for example ball-and-nut power-assisted steering systems.

A rotary slide valve 1 according to the present invention includes a first valve element in the form of a rotary slide 2 and a second valve element which is configured as a control bush 3.

The rotary slide 2 is connected fixedly in terms of rotation to a valve input member 4 which may be configured as a steering spindle connection. The steering spindle connection is connected, for example, to a steering spindle which carries a steering handwheel, via a cardan joint. Moreover, the rotary slide 2 is connected to a valve output member 5 via a backlash coupling.

The valve output member 5 may be configured as a driving pinion or as a ball screw, depending on use in rack-and-pinion or ball-and-nut power-assisted steering systems.

Arranged on the inner cylindrical surface of the rotary slide 2 are longitudinal control grooves 6 which cooperate with longitudinal control grooves 7 of the control bush 3.

Depending on the direction of rotation, the rotary slide valve 1 makes a pressure-medium connection with a servomotor via the longitudinal control grooves 6 and 7 and via annular grooves 8 in the rotary slide 2.

Furthermore, the valve input member 4 is connected to the valve output member 5 via a torsion-bar spring 9. The valve output member 5, in turn, is connected fixedly in terms of rotation to the control bush 3 via a connecting element 10. These various connections with one another make it possible to have a limited relative rotation of the rotary slide 2 in relation to the control bush 3. As a result of this relative rotation of the valve elements in relation to one another, the pressure medium conveyed by a power-steering pump is conducted, via a pressure-medium reservoir, from the relieved working space of the servomotor into the loaded working space of the latter.

The coupling of the valve output member 5 and the control bush 3 is achieved by a connecting element 10 which is connected in one piece to the control bush 3 here. The connecting element 10 is pressed into the valve output member 5 and is secured against rotation by a boss contour 11. This arrangement allows a play-free take-up. The connecting element 10 is connected to the valve output member 5 in a connection region 12. The connection region 12 is spatially separated from a control region 13 of the control bush 3 by a region 14. In this region 14, at least one cut 15 is made, which ensures torsional rigidity and flexibility of this region 14.

What is claimed is:

1. A rotary slide valve for a power-assisted steering system of a motor vehicle, comprising:

a torsion-bar spring;
a backlash coupling;
a connecting element;
a valve input member;
a valve output member;
a valve housing;
a first valve element rotationally fixedly connected to the valve input member and connected to the valve output member via the torsion-bar spring and the backlash coupling; and
a second valve element rotationally fixedly connected to the valve output member via the connecting element, the connecting element including at least one cut disposed in a first region between a connection region and a control region;
wherein the first valve element and the second valve element are arranged coaxially movable one in the other in the valve housing and are rotatable relative to one another at most by an amount of rotary travel of the backlash coupling, a radially outer one of the first valve element and the second valve element having inner longitudinal control grooves, a radially inner one of the first valve element and the second valve element having outer longitudinal control grooves, an axial length of the control grooves being at least partially limited, the control grooves being configured to cooperate with one another to control a pressure medium to and from two working spaces of a servomotor.

2. The rotary slide valve according to claim 1, wherein the control grooves are configured conically to adjust a characteristic curve.

3. The rotary slide valve according to claim 1, wherein the first valve element and the valve output member are connected one of positively and nonpositively.

4. The rotary slide valve according to claim 3, wherein one of the connecting element and the valve output member includes a boss contour.

5. The rotary slide valve according to claim 1, wherein the first region is torsionally rigid and flexible.

6. The rotary slide valve according to claim 1, wherein the cut is continuous.

7. The rotary slide valve according to claim 1, wherein the cut includes a groove.

8. The rotary slide valve according to claim 1, wherein the first region includes a hollow shaft.

9. The rotary slide valve according to claim 1, wherein the first region includes a solid shaft.

10. The rotary slide valve according to claim 1, wherein the first region includes a polygonal profile.

11. The rotary slide valve according to claim 1, wherein the cuts are formed by one of high-energy beam cutting, plasma cutting, erosion cutting, punching, grinding and milling.

12. The rotary slide valve according to claim 1, wherein the connecting element is configured as a control bush.

* * * * *